Patented May 27, 1924.

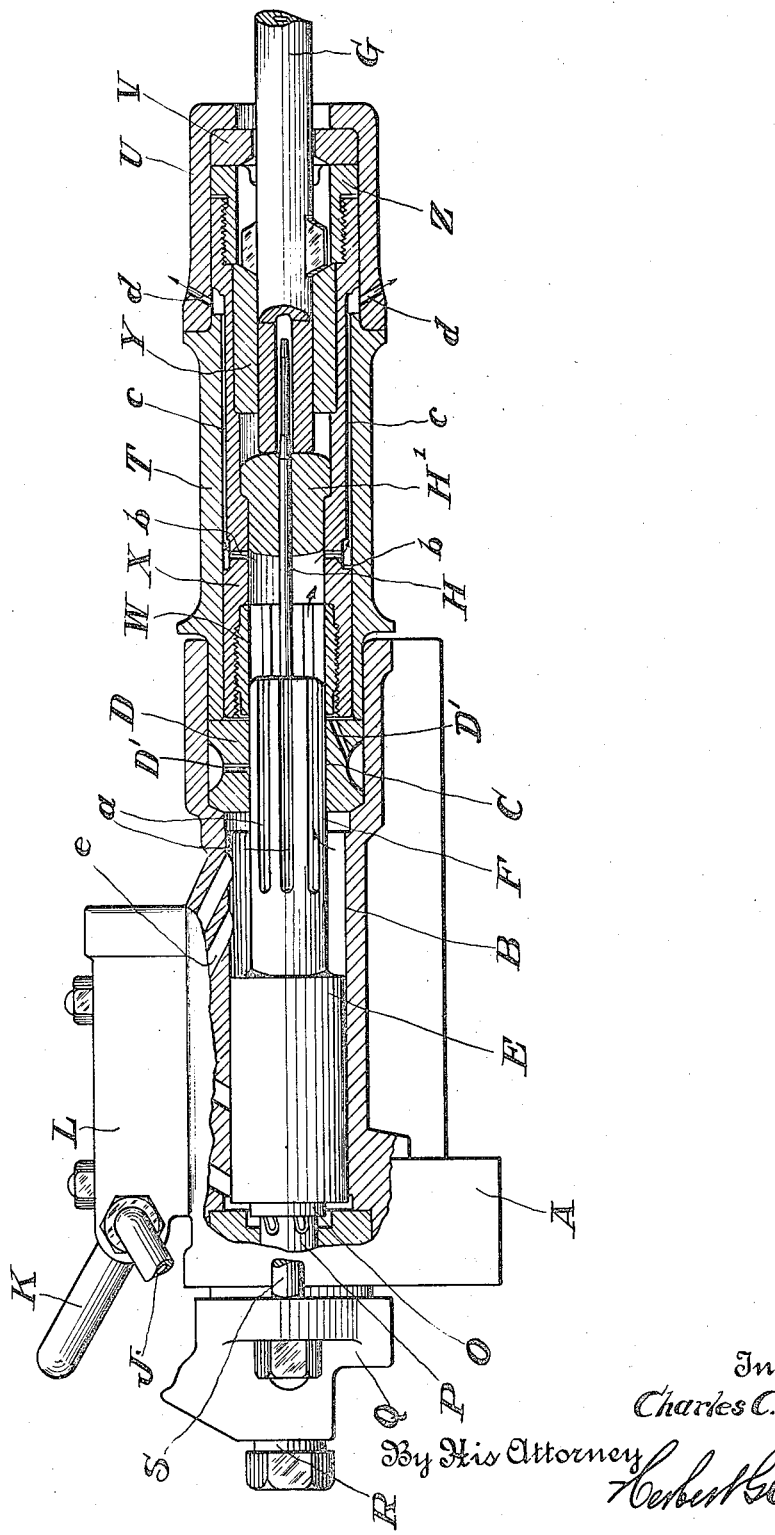

1,495,299

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

CHUCK FOR PREVENTING DUST WITH ROCK DRILLS.

Application filed April 7, 1922. Serial No. 550,422.

*To all whom it may concern:*

Be it known that I, CHARLES C. HANSEN, a citizen of the United States, and a resident of Easton, county of Northampton, and State of Pennsylvania, have invented a certain Chuck for Preventing Dust with Rock Drills, of which the following is a specification accompanied by drawings.

This invention relates to a fluid actuated rock drill of the hammer type, and its primary object is to substantially prevent or reduce to a minimum the blowing of motive fluid down through the hollow drill steel along with the water used for cleansing the hole in the rock, thus preventing fogging and the creation of fine dust in the atmosphere.

In that type of rock drill having a piston provided with a fluted forward piston extension, motive fluid blowing through the flutes from the main cylinder bore may be prevented from passing to the hollow drill steel, in accordance with this invention, by means of an anvil block forming an air tight fit in the drill chuck, and by providing a passage or passages leading to atmosphere from a point or points between the main cylinder bore and the anvil block, which permit the escape of air passing through the flutes.

The invention is shown in one of its preferred forms in the accompanying drawing, which is a side elevation partly broken away and partly in vertical section of so much of a rock drill as will serve to illustrate the invention.

Referring to the drawings, the cylinder A is provided with a main bore B and a forward bore C of smaller diameter, which latter bore may be formed by a cylinder front washer D either separate from or integral with the cylinder. In this instance the washer D is formed with passages D' through which lubricant may flow to the moving parts of the drill. A piston E is adapted to reciprocate in the cylinder and is provided with a forward extension F fitting the bore C of smaller diameter. A hollow drill steel G is carried in the usual manner by the forward end of the machine, and extends into the machine to a position to receive the impact of blows of the piston. A water tube H extends longitudinally through and approximately fits a hole in the piston, and also approximately fits a hole in the anvil block H', and is adapted to deliver water to the drill steel.

Motive fluid is supplied to the machine through the inlet J controlled by a suitable throttle valve of which the controlling handle K only is indicated. A suitable fluid distributing valve may be provided in the valve chest L, but as the distribution of motive fluid to the cylinder forms no part of the present invention, the details of such construction are not indicated. The piston is provided with a rifle bar nut O cooperating with the rifle bar P and the usual back head is indicated at Q having the water connection R. The parts of the machine are held together by the usual side bolts S, a portion of one side bolt being shown.

Any suitable and usual front head construction for the machine may be provided, which at the same time embodies my present invention, and in this instance, the front head T is provided with the front head cap U, in which is located the chuck key V. A chuck nut W is threaded to the chuck X and within the chuck is located the chuck bushing Y and the anvil block H'. The chuck driver Z, preferably screw threaded to the chuck, is suitably clutched to the chuck key V.

In the present construction, the flutes $a$ on the forward extension of the piston extend rearwardly from the forward end a sufficient distance to permit the flutes to enter the main cylinder bore B of the cylinder when the piston is in its rearmost position, as indicated in the figure, whereby communication is opened between the main bore B and the smaller forward bore C of the cylinder, permitting motive fluid to blow through the flutes into the front head parts of the machine.

In order to prevent the motive fluid passing through the flutes from passing to the drill steel G, the anvil block H' is made substantially an air tight fit in the chuck X, thus sealing communication around the anvil block between the smaller bore C of the cylinder and the drill steel. In addition, a vent or vents $b$ to atmosphere, are located at a point or points between the main cylinder bore B and the anvil block H', for permitting the escape of motive fluid passing through the flutes $a$ without passing to the drill steel. Passages $c$ in the chuck X preferably connect the vents or ports *b* with atmospheric vents *d* located forwardly of the anvil block, and for convenience, provided in the front head cap U. Lubricant is blown from the smaller cylinder bore C through the vents *b* and passages *c* and serves to lubricate the rotating chuck X.

The pressure of motive fluid in the forward end of the main cylinder bore B is relieved and reduced practically to atmospheric pressure, as the flutes *a* enter the cylinder bore, because in accordance with my invention, an exhaust port *e* is over-run by the piston with the position of the parts as indicated in the drawing. The pressure of motive fluid passing through the flutes *a* is therefore relatively small, and no motive fluid or practically none, can reach the drill steel owing to the seal provided by the anvil block and because of the vents to atmosphere.

I claim:

1. A fluid actuated rock drill, comprising a cylinder having a main bore and a forward bore of smaller diameter, a piston reciprocating in said cylinder and having a forward extension fitting said bore of smaller diameter, flutes on said forward extension extending rearwardly from the forward end a sufficient distance to permit the flutes to enter the main cylinder bore of the cylinder when the piston is in its rearmost position, whereby communication is opened between the main bore and the smaller forward bore of the cylinder permitting motive fluid to blow through the flutes into the front head parts of the machine, a chuck, an anvil block forming a substantially air tight fit in said chuck and thereby sealing communication around the anvil block, between the smaller bore of the cylinder and the drill steel, and passages leading from a point between the main cylinder bore and the anvil block to atmospheric vents forwardly of the anvil block for permitting the escape of motive fluid passing through the flutes without passing to the drill steel.

2. A fluid actuated rock drill, comprising a cylinder having a main bore and a forward bore of smaller diameter, a piston reciprocating in said cylinder and having a forward extension fitting said bore of smaller diameter, flutes on said forward extension extending rearwardly from the forward end a sufficient distance to permit the flutes to enter the main cylinder bore of the cylinder when the piston is in its rearmost position, whereby communication is opened between the main bore and the smaller forward bore of the cylinder permitting motive fluid to blow through the flutes into the front head parts of the machine, a chuck, an anvil block forming a substantially air tight fit in said chuck and thereby sealing communication around the anvil block, between the smaller bore of the cylinder and the drill steel, and longitudinal passages in the chuck leading from a point between the main cylinder bore and the anvil block to atmospheric vents forwardly of the anvil block for permitting the escape of motive fluid passing through the flutes without passing to the drill steel.

In testimony whereof I have signed this specification.

CHARLES C. HANSEN.